US012299947B2

(12) United States Patent
Sao et al.

(10) Patent No.: US 12,299,947 B2
(45) Date of Patent: May 13, 2025

(54) BIOLOGICAL SAMPLE ANALYSIS DEVICE

(71) Applicant: HITACHI HIGH-TECH CORPORATION, Tokyo (JP)

(72) Inventors: Mayu Sao, Tokyo (JP); Hirofumi Inomata, Tokyo (JP); Fumiyasu Sato, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 371 days.

(21) Appl. No.: 17/913,565

(22) PCT Filed: Feb. 8, 2021

(86) PCT No.: PCT/JP2021/004491

§ 371 (c)(1),
(2) Date: Sep. 22, 2022

(87) PCT Pub. No.: WO2021/205737

PCT Pub. Date: Oct. 14, 2021

(65) Prior Publication Data

US 2023/0097384 A1 Mar. 30, 2023

(30) Foreign Application Priority Data

Apr. 9, 2020 (JP) ................................ 2020-070213

(51) Int. Cl.
*G06V 10/22* (2022.01)
*G01N 21/03* (2006.01)
(Continued)

(52) U.S. Cl.
CPC ............ *G06V 10/22* (2022.01); *G01N 21/03* (2013.01); *G01N 21/27* (2013.01);
(Continued)

(58) Field of Classification Search
CPC ...... G06V 10/22; G06V 10/267; G06V 10/56; G06V 10/60; G06V 10/759; G06V 10/764;
(Continued)

(56) References Cited

U.S. PATENT DOCUMENTS

2009/0142232 A1* 6/2009 Okada .................... G01N 21/07
422/68.1
2009/0324032 A1* 12/2009 Chen ..................... G06T 7/0008
382/128

(Continued)

FOREIGN PATENT DOCUMENTS

JP 2004-037322 A 2/2004
JP 2015-014506 A 1/2015

(Continued)

OTHER PUBLICATIONS

1 Search Report mailed Feb. 16, 2024 in European Application No. 21784514.8.

(Continued)

*Primary Examiner* — Ali Bayat
(74) *Attorney, Agent, or Firm* — Miles & Stockbridge, P.C.

(57) ABSTRACT

An object of the present disclosure is to provide a technique capable of acquiring an analysis target region and color information without causing a decrease in extraction accuracy of the analysis target region due to erroneous extraction of a color of a colored label, measuring a solution volume of the specimen, and determining a specimen type. The biological specimen analysis device according to the present disclosure creates a developed view by cutting out a partial region from a color image of a biological sample tube and connecting the partial region along a circumferential direc-
(Continued)

tion of the biological sample tube, and extracts a detection target region from the developed view (see FIG. 6B).

14 Claims, 11 Drawing Sheets

(51) Int. Cl.

| | |
|---|---|
| ***G01N 21/27*** | (2006.01) |
| ***G01N 35/00*** | (2006.01) |
| ***G06T 5/80*** | (2024.01) |
| ***G06T 7/73*** | (2017.01) |
| ***G06T 7/90*** | (2017.01) |
| ***G06V 10/26*** | (2022.01) |
| ***G06V 10/56*** | (2022.01) |
| ***G06V 10/60*** | (2022.01) |
| ***G06V 10/75*** | (2022.01) |
| ***G06V 10/764*** | (2022.01) |

(52) U.S. Cl.
CPC ......... *G01N 35/00732* (2013.01); *G06T 5/80* (2024.01); *G06T 7/74* (2017.01); *G06T 7/90* (2017.01); *G06V 10/267* (2022.01); *G06V 10/56* (2022.01); *G06V 10/60* (2022.01); *G06V 10/759* (2022.01); *G06V 10/764* (2022.01); *G06T 2207/10024* (2013.01)

(58) Field of Classification Search
CPC .. G01N 21/03; G01N 21/27; G01N 35/00732; G06T 5/80; G06T 7/74; G06T 7/90; G06T 2207/10024; G06T 2207/20076; G06T 7/0012; G06T 7/73; G06T 2207/20104
USPC .......................................................... 382/103
See application file for complete search history.

(56) References Cited

U.S. PATENT DOCUMENTS

2011/0056290 A1* 3/2011 Bryant .................. G01F 23/292 901/14
2011/0102542 A1* 5/2011 Chen ..................... G06T 3/4038 348/37
2013/0123089 A1* 5/2013 Johns ...................... B04B 15/00 494/83
2014/0273275 A1* 9/2014 Jacobs ............... G01N 33/6893 436/501
2016/0109350 A1 4/2016 Esaki et al.

FOREIGN PATENT DOCUMENTS

JP 2015-040696 A 3/2015
WO 2017205778 A1 11/2017
WO 2018202804 A1 11/2018

OTHER PUBLICATIONS

Search Report mailed Mar. 23, 2021 in International Application No. PCT/JP2021/004491.
Written Opinion mailed Mar. 23, 2021 in International Application No. PCT/JP2021/004491.

* cited by examiner

BIOLOGICAL SAMPLE ANALYSIS DEVICE

TECHNICAL FIELD

The present disclosure relates to a biological specimen analysis device that analyzes a biological specimen contained in a biological sample tube to which a plurality of labels are attached.

BACKGROUND ART

To improve the efficiency of clinical tests such as blood tests, a technique for automating a biological specimen confirming operation, which has been performed by visual confirmation in the related art, has been proposed. Among them, in a specimen confirming operation before biochemical analysis, there is a demand for an analysis technique for measuring a solution volume of a sample stored in a container such as a blood collection tube or determining a specimen state such as a serum type (normal, hemolysis, icterus, and chyle) in a blood specimen.

As a technique for determining such a specimen state, for example, PTL 1 discloses a detection device that detects information of a biological sample in a biological sample tube to which a label is attached. More specifically, the detection device includes: an image-capturing unit that captures an image of a biological sample tube; a detection target region extraction unit that extracts a detection target region from the image captured by the image-capturing unit; a label extraction unit that extracts a label positioned on an imaging surface side of the image-capturing unit from the image captured by the image-capturing unit; and an analysis unit that identifies a boundary position of the label in the detection target region extracted by the detection target region extraction unit based on the boundary position of the label extracted by the label extraction unit. The detection device acquires information on a specimen type based on measurement of a solution volume and color information of the detection target region extracted from an image of the specimen.

Further, for example, PTL 2 discloses a liquid detection device that detects transmitted light by irradiating a blood collection tube with infrared light, obtains a boundary of a label based on a first derivative value, and estimates a serum amount of the blood collection tube.

CITATION LIST

Patent Literature

PTL 1: JP-A-2015-040696
PTL 2: JP-A-2004-037322

SUMMARY OF INVENTION

Technical Problem

The technique disclosed in PTL 1 relates to a method of extracting color information of a detection region by specifying the boundary position of a label in the detection target region extracted based on the boundary position of the extracted label. However, in PTL 1, for a specimen to which a colored label having a color similar to a color of a detection target is attached, since consideration is not given to identification of the color of the colored label and the color of the detection target region and separation of the colored label region and the detection target region from each other, there is a problem that color extraction accuracy is reduced by erroneously extracting the color of the colored label.

In PTL 2, the boundary of the label is obtained and the serum amount is measured, but color information of an analysis target cannot be acquired, and the specimen type cannot be determined.

The present disclosure has been made in view of such a situation, and provides a technique capable of acquiring an analysis target region and color information without causing a decrease in extraction accuracy of the analysis target region due to erroneous extraction of a color of a colored label, measuring a solution volume of the specimen, and determining a specimen type.

Solution to Problem

The biological specimen analysis device according to the present disclosure creates a developed view by cutting out a partial region from a color image of a biological sample tube and connecting the partial region along a circumferential direction of the biological sample tube, and extracts a detection target region from the developed view.

Advantageous Effects of Invention

According to the biological specimen analysis device in the present disclosure, a color and an amount of a sample consisting of a plurality of components can be detected with high accuracy in a specimen to which a colored label is attached. More features relating to the present disclosure are clarified based on descriptions of the present description and accompanying drawings. Aspects of the present disclosure are achieved and implemented using elements, combinations of various elements, and the following detailed description, and accompanying claims. It should be understood that the descriptions of the present description are merely exemplary, and are not intended to limit the scope of the claims or application examples of the present disclosure in any sense.

DESCRIPTION OF EMBODIMENTS

Embodiments of the present disclosure will be described below with reference to accompanying drawings. In the accompanying drawings, elements with the same functions may be denoted by the same number. The accompanying drawings show specific embodiments and implementation examples consistent with principles of the present disclosure, and are for the understanding of the present disclosure and are not intended to be construed in a limiting sense.

It is necessary to understand that the present embodiments are described in sufficient detail for those skilled in the art to perform the present disclosure, but other implementations and aspects are possible, and a configuration and a structure can be changed and various elements can be replaced without departing from the scope and the spirit of the technical idea of the present disclosure. Therefore, the following description should not be construed as being limited to the embodiments.

In the present embodiment, the description may be divided into a plurality of sections or embodiments if necessary for convenience. Unless particularly specified, the sections or embodiments are not independent of each other, but have a relation in which one section or embodiment is a modification, detailed description, supplementary description, or the like of a part or all of another section or embodiment. When a number and the like (including the number, a numerical value, an amount, a range, and the like) of an element is referred to, the number and the like are not limited to specific numbers, and may be equal to or greater than or equal to or less than the specific numbers, unless otherwise specified or clearly limited to the specific number in principle.

In the following embodiments, it is needless to say that elements (including element steps and the like) are not necessarily essential unless otherwise particularly specified or clearly considered as essential in principle.

Similarly, in the following embodiments, when shapes, positional relations, and the like of the elements or the like are mentioned, the embodiments include those substantially approximate or similar to the shapes or the like unless otherwise particularly specified or except the case where it is conceivable that they are apparently excluded in principle. The same applies to the numerical value and the range.

The same components are denoted by the same reference signs in principle throughout all the drawings for showing the embodiments, and the repetitive description thereof may be omitted.

First Embodiment

<Device Configuration of Biological Specimen Analysis Device>

Figure 1:
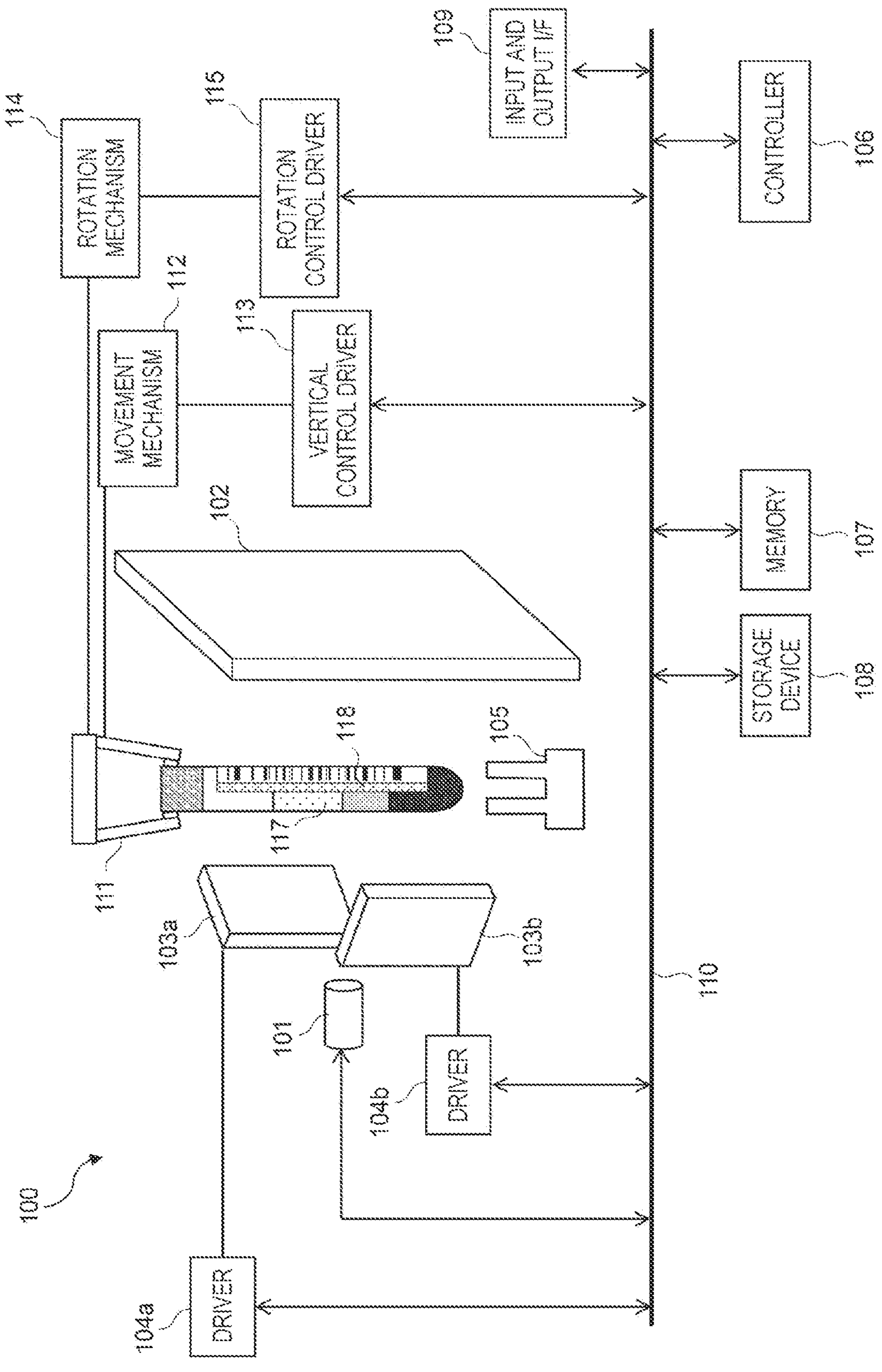
FIG. 1 is a diagram showing a schematic configuration example of a biological specimen analysis device 100 according to a first embodiment.

FIG. 1 is a diagram showing a schematic configuration example of a biological specimen analysis device 100 according to a first embodiment of the present disclosure. The biological specimen analysis device 100 includes a fixed camera 101, a background plate 102, light sources 103*a* and 103*b*, light source drivers 104*a* and 104*b*, a biological sample tube holder 105, a controller 106, a memory 107, a storage device 108, an input and output interface 109, a data bus 110, a gripping mechanism 111, a movement mechanism 112, a vertical control driver 113, a biological sample tube rotation mechanism 114, and a rotation control driver 115.

The controller 106 is implemented by, for example, a processor (central processing unit: CPU or like), and reads various programs stored in the memory 107 or the storage device 108, loads the programs in an internal memory (not shown) to generate an image processing unit to be described later, and executes the programs at a predetermined timing.

The input and output interface 109 includes a keyboard, a touch panel, a microphone, a switch, a display device, a printer, a speaker, and the like, and is used for displaying an analysis result (a type, an amount, and the like of the biological specimen) of the detected biological specimen, checking a state of the biological specimen before analysis, and the like. The input and output interface 109 receives input of parameters used for setting a predetermined region cutting condition, which will be described later, data transmission, and analysis of a biological sample type, and/or a biological sample amount, and the like.

The gripping mechanism 111 grips a biological sample tube 116 installed in the biological sample tube holder 105. The vertical control driver 113 controls the movement mechanism 112 to move the gripping mechanism 111 in a vertical direction.

The biological sample tube 116 installed in the biological sample tube holder 105 is conveyed by a transfer line and stopped by a stop mechanism (not shown) or the like. The movement mechanism 112 moves the biological sample tube 116 gripped by the gripping mechanism 111 to a position where an image of the entire biological sample tube 116 is captured by the fixed camera 101.

When the gripping mechanism 111 moves the biological sample tube 116 upward, the entire biological sample tube 116 is irradiated with lights from the light source 103*a* and the light source 103*b*. More specifically, the biological sample tube 116 installed in the biological sample tube holder 105 is gripped by the gripping mechanism 111 and moved within a field of view of the fixed camera 101 by the movement mechanism 112. At this time, the vertical control driver 113 adjusts a vertical position of the biological sample tube 116 by controlling a moving amount of the movement mechanism 112. The fixed camera 101 needs to acquire a two-dimensional color image of at least a detection target region 117 of the biological sample tube 116. Therefore, the vertical control driver 113 determines the moving amount of the movement mechanism 112 according to a length of the biological sample tube 116, so that the detection target region 117 is moved within the field of view of the fixed camera 101 regardless of the length of the biological sample tube 116, and an image of the detection target region 117 can be captured in a state where the detection target region 117 is illuminated by the light source 103*a* and the light source 103*b*.

The rotation control driver 115 rotates the biological sample tube 116 gripped by the gripping mechanism 111 by controlling the biological sample tube rotation mechanism 114. The fixed camera 101 can capture an image of the entire circumference of the biological sample tube 116 by capturing the image while rotating the biological sample tube 116. A method of capturing an image by the fixed camera 101 while controlling the rotation of the biological sample tube rotation mechanism 114 by the rotation control driver 115 will be described later.

The fixed camera 101 is an image-capturing device such as a charge coupled device (CCD) image sensor or a complementary metal-oxide semiconductor (CMOS) image sensor. The fixed camera 101 acquires a two-dimensional color image of the biological sample tube 116 illuminated by the light source 103*a* and the light source 103*b* against the background plate 102, and inputs the image to the controller 106. By using the illumination such as the light source 103*a* and the light source 103*b* instead of natural light, and the background plate 102, even when the detection target region 117 has a transparent color, for example, as in serum, it is possible to reduce variation in color measurement of the detection target region 117 extracted for analysis and variation due to an influence of external light, and to improve analysis accuracy.

The light source 103*a* and the light source 103*b* are implemented by, for example, white LEDs, and are controlled by the light source driver 104*a* and the light source driver 104*b* Brightness of the light source 103*a* and the light source 103*b* influences a color (pixel value) of a color image of the biological sample tube 116 acquired by the fixed camera 101. Since variation in the brightness of the light source influences the analysis result, for example, variation in the analysis result caused by the illumination can be reduced by performing image-capturing evaluation of a calibration jig without color fading, analysis of a color of a background image of the biological sample tube 116, and calibration of adjusting the brightness of the light sources 103*a* and 103*b* before the measurement.

The color image acquired by the above configuration is used by the controller 106 for image processing and analysis processing described later, and the controller 106 calculates (detects) a color and an amount of the detection target region 117. The memory 107 or the storage device 108 stores, for example, a color feature value of serum necessary for analyzing the color of the detection target region 117. Information such as information on the color of the detection target region 117 and the analysis result is passed to the controller 106 through a data bus 110 and output from the input and output interface 109 (for example, displayed on a display screen of a display device).

<Functions Implemented in Controller 106>

Figure 2:
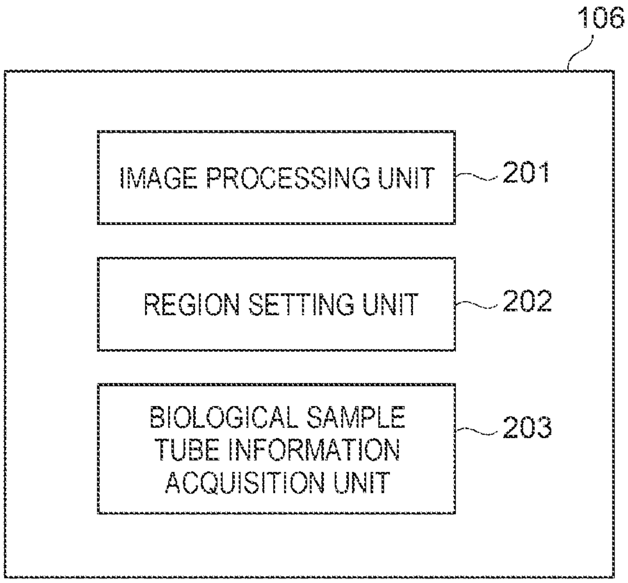
FIG. 2 is a diagram showing schematic functions implemented by loading a program stored in a memory 107 or a storage device 108 in a controller (processor) 106.

FIG. 2 is a diagram showing schematic functions implemented by loading a program stored in the memory 107 or the storage device 108 in the controller (processor) 106. As shown in FIG. 2, the controller 106 includes an image processing unit 201, a region setting unit 202, and a biological sample tube information acquisition unit 203 as functions implemented by software.

The image processing unit 201 generates a developed view by processing to be described later based on a plurality of two-dimensional color images acquired by the fixed camera 101, extracts the detection target region (for example, a serum region) 117 from the developed view, and performs processing such as specification of a color of a detection target and a specimen type, calculation of the solution volume, and the like.

The region setting unit 202 is a processing unit that implements a function of allowing a user (operator) to set and change a predetermined region (cut-out region) in two-dimensional color image cut-out processing for generating a developed view described later.

For example, when the user designates a reference coordinate value, a width, a height, and the like in a captured image of a predetermined region using a touch panel which is the input and output interface 109, the region setting unit 202 sets the predetermined region for a target two-dimensional color image. Alternatively, the predetermined region can be set and changed by storing, in the memory 107 or the storage device 108, a setting file describing the reference coordinate value, the width, the height, and the like in the captured image of the predetermined region, and reading information of the setting file from a program.

The biological sample tube information acquisition unit 203 is a processing unit that implements a function of acquiring, setting, and changing color information (a range of label color distribution) and/or size information of a colored label 118 to be extracted in extracting processing of the detection target region 117 to be described later and/or size (a diameter and a length in a long axis direction) information of the biological sample tube 116 to be analyzed.

For example, when the user inputs the color information (the range of the label color distribution) and/or the size information of the colored label 118 and the size information of the biological sample tube 116 using the touch panel which is the input and output interface 109, the biological sample tube information acquisition unit 203 sets and changes the color or size information of the colored label 118 extracted in the extracting processing of the detection target region 117 to be described later and the size information of the biological sample tube 116. Alternatively, the color or size information of the colored label 118 and the size information of the biological sample tube 116 can be set and changed by storing, in the memory 107 or the storage device 108, a setting file describing label color information, and reading information of the setting file from a program.

<Internal Configuration of Image Processing Unit>

Figure 3:
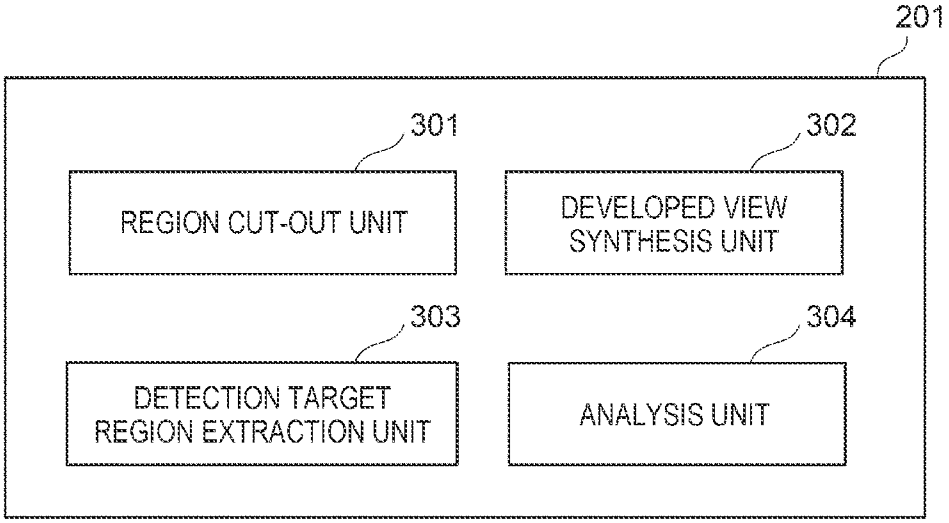
FIG. 3 is a diagram showing an example of an internal configuration of an image processing unit 201.

FIG. 3 is a diagram showing an example of an internal configuration of the image processing unit 201. As shown in FIG. 3, the image processing unit 201 includes a region cut-out unit 301, a developed view synthesis unit 302, a detection target region extraction unit 303, and an analysis unit 304. Details of the operation of each processing unit will be described later. In brief, the following processing is performed respectively.

The region cut-out unit 301 performs processing for cutting out a region set by the region setting unit 202 from each two-dimensional color image.

The developed view synthesis unit 302 performs processing for generating one developed view by connecting a plurality of images cut out by the region cut-out unit 301 along a circumferential direction of the biological sample tube 116.

The detection target region extraction unit 303 performs processing for extracting the detection target region (for example, a serum region) 117 based on color information of a detection target (for example, the serum region) acquired in advance or color information of a label to be attached to a biological sample tube acquired by the biological sample tube information acquisition unit 203.

The analysis unit 304 performs processing for specifying the color of the detection target region 117 extracted by the detection target region extraction unit 303, determining a type of a biological specimen based on the color information, and calculating a solution volume of the biological specimen based on the detection target region 117 extracted by the detection target region extraction unit 303.

<Outline of Biological Sample Analysis Processing>

Figure 4:
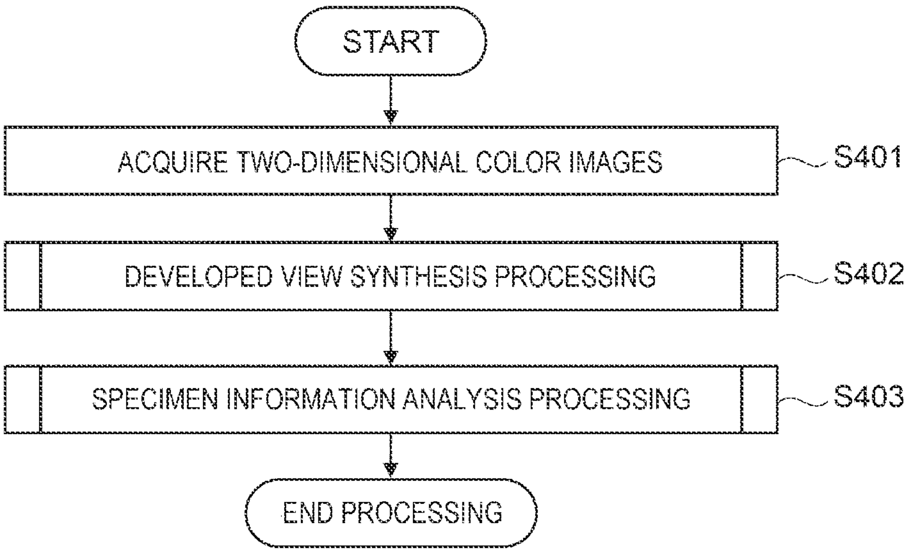
FIG. 4 is a flowchart showing an outline of biological specimen analysis processing performed by the biological specimen analysis device 100.

FIG. 4 is a flowchart showing an outline of biological specimen analysis processing performed by the biological specimen analysis device 100 according to the present embodiment. In the following description, an operation subject of each step is the corresponding processing unit, but since each processing unit is implemented by a program stored in the memory 107 or the storage device 108, the controller 106 which is an execution subject of the program may be interpreted as the operation subject of each step.

According to the biological specimen analysis processing in the present embodiment, in the biological sample tube 116 in which the colored label 118 is attached to the biological sample tube 116, the colored label 118 having a color similar to a color of the detection target region 117 is prevented from being erroneously extracted as a part of the detection target region 117, and analysis accuracy of the color and the amount of the detection target region 117 is improved.

(FIG. 4: Step S401: Acquire Two-dimensional Color Images)

The image processing unit 201 acquires a plurality of two-dimensional color images of the biological sample tube 116 captured by the fixed camera 101.

(FIG. 4: Step S401: Regarding Image Capturing Method)

A method of capturing an image of the biological sample tube 116 will be described. In order to analyze the color and the amount of the detection target region 117 based on the two-dimensional color images, a two-dimensional color image of a region in which the detection target region 117 is exposed in the biological sample tube 116 to which a label is attached is required. In order to perform developed view generation processing by the developed view synthesis unit 302 to be described later, the plurality of two-dimensional color images acquired while rotating the biological sample tube 116 are required. Therefore, the biological sample tube rotation mechanism 114 and the rotation control driver 115 control the rotation of the biological sample tube 116 based on a command of the controller 106, thereby capturing the plurality of two-dimensional color images while rotating the biological sample tube 116. For example, the biological sample tube rotation mechanism 114 rotates the biological sample tube 116, and the rotation control driver 115 controls a rotation speed or a rotation acceleration, a rotation angle, the number of rotations, and a starting timing of rotation. As described above, a plurality of images having information on the entire circumference of the biological sample tube 116 can be acquired.

(FIG. 4: Step S401: Regarding Image Capturing Method: Supplement 1)

When the user (operator) inputs the biological sample tube 116 into the biological specimen analysis device 100 such that an orientation of the biological sample tube 116 gripped by the gripping mechanism 111 is aligned, it is not necessary to capture the image of the entire circumference of the biological sample tube 116, and it is sufficient that a plurality of two-dimensional color images obtained by capturing the region of the detection target region 117 can be acquired while rotating the biological sample tube 116.

(FIG. 4: Step S401: Regarding Image Capturing Method: Supplement 2)

On the other hand, when the user (operator) inputs the biological sample tube 116 into the biological specimen analysis device without aligning the orientation of the biological sample tube 116 gripped by the gripping mechanism 1, the captured image of the detection target region 117 can be reliably acquired by acquiring the plurality of two-dimensional color images while rotating the biological sample tube 116 such that the information on the entire circumference of the biological sample tube 116 can be acquired. For example, when 36 (36 frames) images are acquired by repeating acquisition of images by the fixed camera 101 every time the biological sample tube 116 is rotated by 10 degrees, the information on the entire circumference of the biological sample tube 116 can be acquired.

(FIG. 4: Step S401: Regarding Image Capturing Method: Supplement 3)

The rotation angle and the speed or acceleration of rotation do not have to be constant. For example, the image of the entire circumference of the biological sample tube 116 may be captured with a total of 32 frames, for example, by accelerating from a low speed between a first frame and a second frame and decelerating between a 31st frame and a 32nd frame. A shutter speed and an image-capturing timing of a camera may be changed based on a rotation control signal.

(FIG. 4: Step S402: Developed View Synthesis Processing)

The image processing unit 201 performs each image processing in the region cut-out unit 301 and the developed view synthesis unit 302, and creates one developed view based on the two-dimensional color images acquired in S401. Details of this step will be described later with reference to FIG. 5.

(FIG. 4: Step S403: Specimen Information Analysis)

The image processing unit 201 performs the processing of the detection target region extraction unit 303 and the analysis unit 304, extracts the detection target region 117 from the developed view acquired in S402 (described in detail later), and acquires (obtains by calculation) information such as a color and an amount of a detection target acquired in the detection target region 117. For example, color information corresponding to the type of the biological specimen is stored in advance in the memory 107 or the storage device 108, and the analysis unit 304 collates the acquired color information with the color information stored in advance in the memory 107 or the like, whereby the type of the biological sample can be determined based on the color information of the detection target region 117. For example, when the detection target region 117 is serum, a serum color has a feature depending on a serum state (normal, hemolysis, icterus, and chyle). Therefore, the serum state of the specimen can be determined by storing the color feature value, a range of a color space used for classification, and a threshold in the memory 107 and collating the acquired color information by the analysis unit 304. A solution volume of a detection target can be calculated based on information on the number of pixels in a height direction (a vertical direction of the two-dimensional color image) of the detection target region 117 and information on a diameter of the biological sample tube 116. The diameter of the biological sample tube 116 is acquired by, for example, directly inputting information such as a model number of the biological sample tube 116 to be used or the diameter of the biological sample tube 116 by the user using the touch panel which is the input and output interface 109.

(FIG. 4: Step S403: Specimen Information Analysis: Supplement 1)

By determining the specimen type before, for example, biochemical analysis, it is possible to set a flag in advance for a specimen that influences on biochemical analysis accuracy, such as abnormal serum (hemolysis, icterus, and chyle). By calculating the solution volume in the detection target region 117 in the analysis unit 304, it is possible to check in advance whether a sufficient solution volume can be secured for the analysis. Accordingly, when the solution volume is insufficient, it is possible to cope with, for example, re-sampling, and biochemical analysis efficiency is improved.

(FIG. 4: Step S403: Specimen Information Analysis: Supplement 2)

For example, for the biological sample tube 116 to which the colored label 118 having a color similar to the color of the detection target region 117 is attached, such as yellow or red of the serum color, the color of the colored label 118 may be erroneously extracted as a detection target and the specimen type may be erroneously determined. When a region of the colored label 118 is erroneously extracted as the detection target region 117, the solution volume may be erroneously calculated. Therefore, by identifying the label color and the color of the detection target by the processing to be described later in the detection target region extraction unit 303 and extracting only the detection target region 117 by removing the colored label 118, it is possible to avoid erroneous determination caused by the colored label 118 and erroneous calculation of the solution volume, and it is possible to improve determination accuracy of the specimen type and measurement accuracy of the solution volume.

(FIG. 4: Step S403: Specimen Information Analysis: Supplement 3)

In this step, the colored label 118 and the detection target region 117 can be distinguished by, for example, the following procedure. The biological sample tube information acquisition unit 203 acquires in advance color information (hue, saturation, brightness value distribution and/or threshold) of a label to be used by performing the label calibration processing (to be described later), and stores the color information of the label to be used in the memory 107 or the storage device 108. Only the region of the colored label 118 is removed from the developed view by generating a mask for extracting, from the developed view acquired in S402, only the region of the colored label 118 based on the label color information stored in advance.

<Detailed Contents of Developed View Synthesis Processing>

Figure 5:
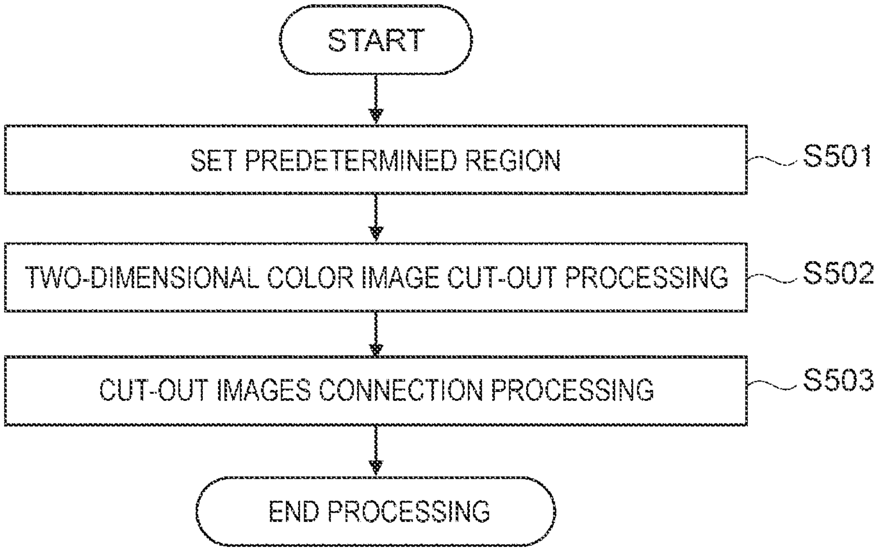
FIG. 5 is a flowchart showing detailed contents of S402 (developed view synthesis processing) in FIG. 4.

FIG. 5 is a flowchart showing detailed contents of S402 (developed view synthesis processing) in FIG. 4. In the following description, an operation subject of each step is the corresponding processing unit, but since each processing unit is implemented by a program stored in the memory 107 or the storage device 108, the controller (processor) 106 which is an execution subject of the program may be interpreted as the operation subject of each step.

In order to acquire one developed view based on the two-dimensional color images, the region setting unit 202 sets a predetermined region for each of the two-dimensional color images, and the region cut-out unit 301 cuts out the region set by the region setting unit 202 from the two-dimensional color images. The developed view synthesis unit 302 connects the cut-out images of the plurality of two-dimensional color images cut out by the region cut-out unit 301 to synthesize one developed view.

(FIG. 5: Step S501: Predetermined Region Setting)

The region setting unit 202 sets a predetermined region for each of the plurality of two-dimensional color images acquired in S401 in response to a setting input of a predetermined region (cut-out region of the two-dimensional color image) by the user or a setting file stored in the memory 107 or the storage device 108. The setting input by the user or a description content of the setting file is, for example, a width and a height of the predetermined region, and a reference coordinate value in the captured image. Details of this step will be described later with reference to FIGS. 6A to 7.

(FIG. 5: Step S502: Two-dimensional Color Image Cutting Out)

The region cut-out unit 301 cuts out a predetermined region (cut-out region) set in S501 from each of the plurality of two-dimensional color images acquired in S401.

(FIG. 5: Step S503: Cut-out Images Connection Processing)

The developed view synthesis unit 302 connects the cut-out images of the plurality of two-dimensional color images output in S502 to synthesize one developed view. In the developed view, a connection portion can be made smooth by applying a smoothing filter such as a Gaussian filter.

Figure 6A:
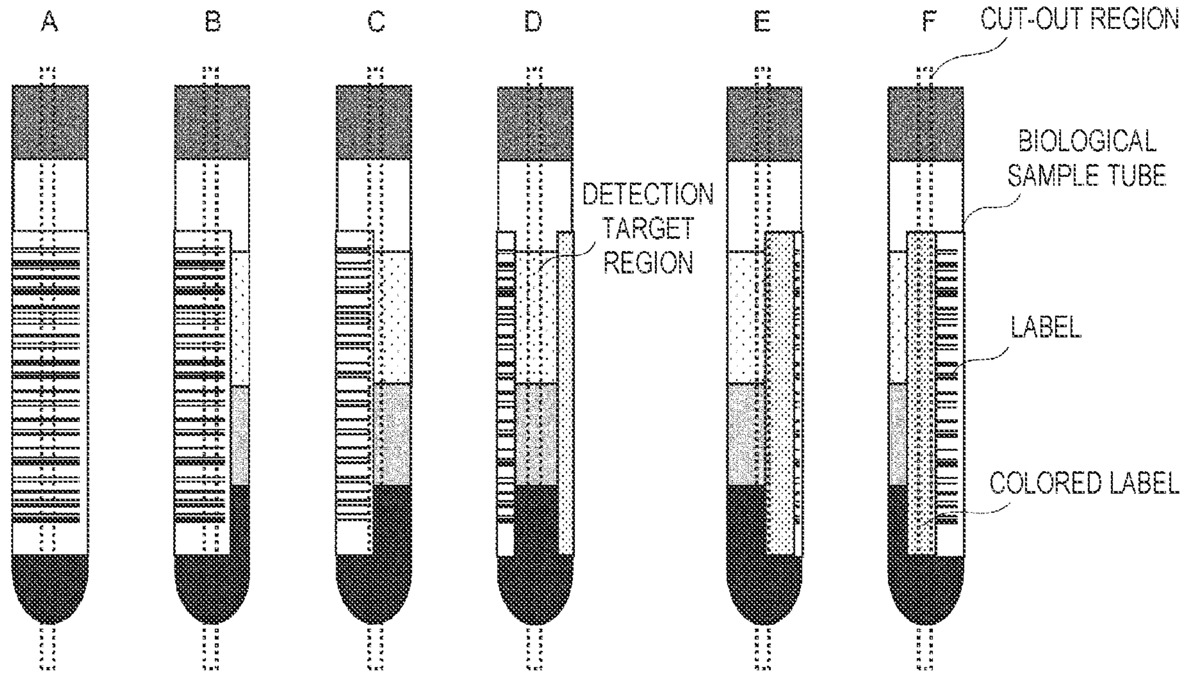
FIG. 6A is a diagram showing a setting example in which an image center is set as a predetermined region in S501.

FIG. 6A is a diagram showing a setting example in which an image center is set as the predetermined region in S501. When the biological sample tube 116 is rotated and captured by the fixed camera 101, the plurality of two-dimensional color images of the biological sample tube 116 having different orientations are acquired as shown in FIG. 6A. The region setting unit 202 sets the predetermined region for each image. FIG. 6A shows an example in which the predetermined region is set so as to be symmetrical with the center of each acquired image as reference coordinates, but the cut-out region is not limited thereto. Coordinates and a width of the predetermined region may be changed for each image based on information such as the rotation speed or the rotation acceleration of the biological sample tube rotation mechanism 114.

Figure 6B:
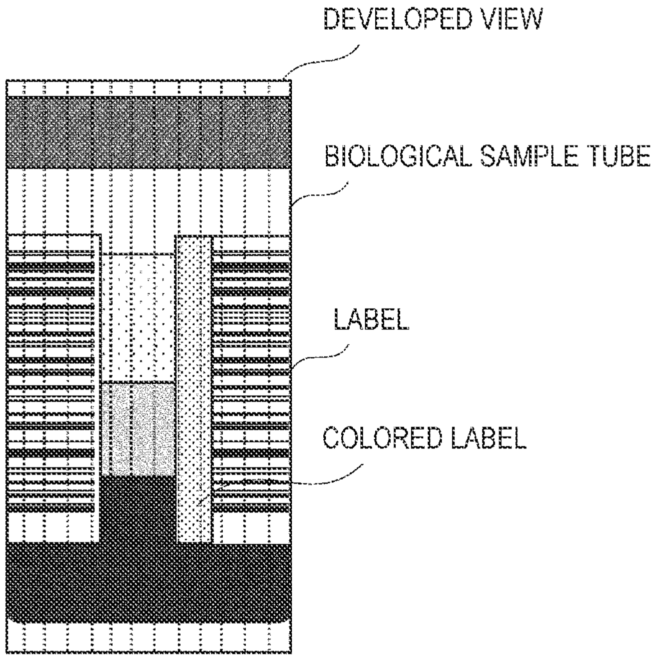
FIG. 6B is an example of a developed view created in processing of S502 and the subsequent steps.

FIG. 6B is an example of a developed view created in the processing of S502 and the subsequent steps. In S502, the predetermined region set in S501 is cut out from each image, and in S503, the cut-out images are connected and synthesized into one developed view.

A method of setting the predetermined region (cut-out region) will be described. Depending on setting contents of the predetermined region, synthesis accuracy of the developed view acquired in the processing of S503 and the subsequent steps and variation in color distribution of the detection target region 117 acquired by the detection target region extraction unit 303 change. First, an influence of the setting of the coordinates and the width of the predetermined region on the synthesis accuracy of the developed view will be described.

When an image of the cylindrical biological sample tube 116 as a blood collection tube is captured and the developed view is synthesized, by setting the coordinates and the width of the predetermined region in consideration of curvature of the biological sample tube 116, the distortion of the developed view after the synthesis is reduced, and extraction accuracy of the detection target region 117 is improved. For example, center coordinates of the captured image in a horizontal direction are set as the reference coordinates of the predetermined region, and a region symmetrical to the reference coordinates is set as the predetermined region such that approximately 8% of a width of the biological sample tube 116 (when a region of the biological sample tube 116 is 128 pixels, 10 pixels) is the width of the predetermined region. Accordingly, an influence of the curvature of the biological sample tube 116 can be reduced. The influence of the curvature decreases as the width of the predetermined region is narrowed, but in order to acquire a developed view including the information on the entire circumference of the biological sample tube 116, it is necessary to increase the number of captured images of the biological sample tube 116 as the width of the predetermined region is narrowed.

Figure 7:
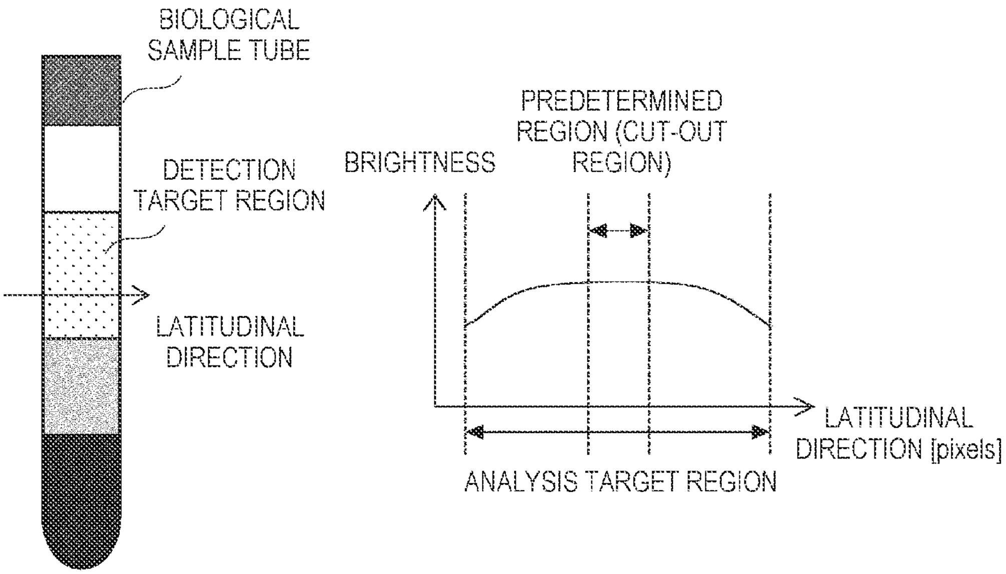
FIG. 7 is a diagram showing an example of brightness distribution of an image of a detection target region 117 captured by a fixed camera 101.

FIG. 7 is a diagram showing an example of brightness distribution of an image of a detection target region 117 captured by the fixed camera 101. With reference to FIG. 7, an influence of the setting of the coordinates and the width of the predetermined region on the color distribution of the detection target region 117 will be described. When an image is acquired in a state where the biological sample tube 116 is illuminated by the light source 103*a* and the light source 103*b*, even when the detection target region is a uniform solution, the center of the detection target region 117 has high brightness, and an end portion thereof has low brightness. For this reason, for example, by setting a central region in which a variation width in a brightness value along a circumferential direction is within an allowable range (for example, constant) as a predetermined region, only a region in which a brightness value is uniform is cut out from each image, and a developed view is synthesized. Accordingly, the variation in the brightness value of the detection target region 117 after the synthesis is reduced, and the analysis accuracy of the color of the detection target region 117 is improved. That is, the region setting unit 202 determines a predetermined region such that the variance of the brightness value after the synthesis is reduced based on the brightness distribution of the two-dimensional color image.

By reducing the variation in brightness of the cut-out region, it is possible to similarly reduce the variation in the brightness value of the region of the colored label 118 after developed view synthesis as for the color of the colored label 118. That is, it is possible to reduce an overlap of the color distributions of the detection target region 117 and the colored label 118 in the synthesized developed view, and it is possible to improve the analysis accuracy of separating the colors of the detection target region 117 and the colored label 118 in the processing performed by the detection target region extraction unit 303. When separation and removal accuracy of the colored label 118 is improved, erroneous extraction of the colored label 118 can be avoided, and the analysis accuracy of the color and the amount of the detection target can be improved.

Figure 8:
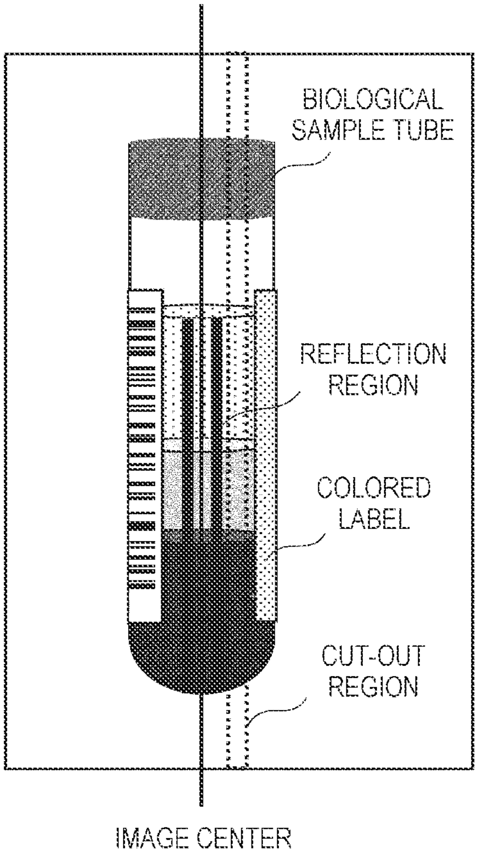
FIG. 8 is a diagram showing an example in which two linear reflection regions appear in a center of a biological sample tube 116.

FIG. 8 is a diagram showing an example in which two linear reflection regions appear in a center of the biological sample tube 116. When an image is captured in a state where the predetermined region of the biological sample tube 116 is illuminated by the light source 103*a* and the light source 103*b*, a reflected component of the light from the light source 103*a* and the light source 103*b* may be reflected on a surface of the biological sample tube 116. Since a region of the reflected component usually has a high brightness value and is white, when a reflected component exists in the detection target region 117, the reflected component becomes noise in the specimen information analysis processing. Therefore, the region setting unit 202 sets set coordinates of the predetermined region in a region in which the reflected light noise does not appear, so that the region of the reflected component can be removed from the detection target region 117 after the developed view synthesis, and the analysis accuracy of the color of the detection target region 117 can be improved.

By removing the region of the reflected component, erroneous detection can be avoided in which the white reflected component is recognized as a boundary between a white label and the detection target region 117, the extraction accuracy of the detection target region 117 is improved, and the analysis accuracy of the amount of the detection target is improved. For example, when the two linear reflection regions as shown in FIG. 8 appear, reflection of the reflected component can be avoided by setting a region between the reflection regions (the center of the biological sample tube 116) to be the predetermined region, or by setting the outside of the reflection regions to be the predetermined region.

A method of setting the width of the predetermined region in consideration of the number of captured images of the biological sample tube 116 by the fixed camera 101 and the rotation speed of the biological sample tube rotation mechanism 114 will be described. As described above, the effect of improving the synthesis accuracy of the developed view and reducing the variation in the color distribution of the detection target region 117 can be obtained by the setting of the coordinates and the width of the predetermined region. However, in order to acquire the developed view including the information on the entire circumference of the biological sample tube 116, it is necessary to set the width of the predetermined region such that there is no missing region after the developed view synthesis in consideration of the rotation speed of the biological sample tube rotation mechanism 114 and an image-capturing pitch of the fixed camera 101.

For example, when the biological sample tube 116 (blood collection tube) is rotated one round in a state where the rotation speed of the biological sample tube rotation mechanism 114 is constant, and 36 images are acquired at a constant image-capturing interval, the biological sample tube 116 is rotated by 10° between frames. When a developed view around the entire circumference of the biological sample tube 116 is acquired from 36 captured images, a radius of the biological sample tube 116 is set to r [mm], and the width of the predetermined region is required to be at least approximately ($2\pi r/36$) [mm].

When the rotation speed of the biological sample tube rotation mechanism 114 is not constant, and the biological sample tube rotation mechanism 114 is controlled to accelerate at the beginning of the rotation, reach a constant speed, and then decelerate to end the rotation by the rotation control driver 115, by setting the width of the predetermined region corresponding to the acceleration of the biological sample tube rotation mechanism 114 for each imaging, the developed view of the entire circumference of the biological sample tube 116 can be efficiently acquired without missing or overlapping regions.

Based on a control signal of the rotation control driver 115, the image-capturing timing of the fixed camera 101 may be controlled, and the width of the predetermined region according to the rotation speed of the biological sample tube rotation mechanism 114 and the image-capturing timing of the fixed camera 101 may be set.

In addition to the above-described effects, by acquiring a developed view of only a region of interest (for example, the detection target region 117) by setting the coordinates and the width of the predetermined region in a vertical direction, an image size of the developed view to be output in the subsequent processing can be reduced, and calculation processing can be reduced. By setting the predetermined region to exclude an unnecessary region for analysis, such as a region in which only an image of a background plate is captured, the noise in the specimen information analysis processing can be removed and the analysis accuracy can be improved.

<Detailed Contents of Specimen Information Analysis Processing>

Figure 9:
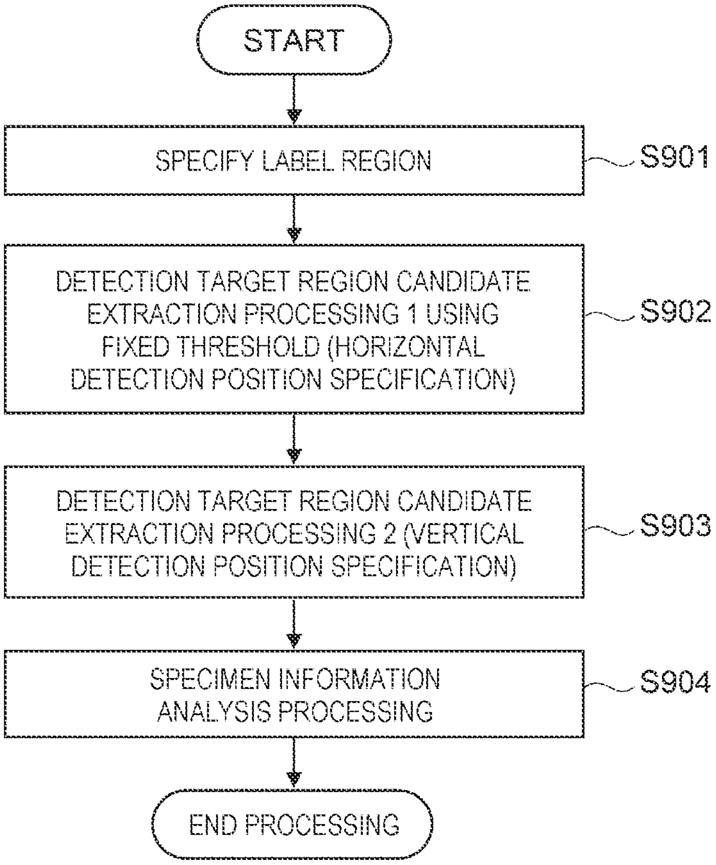
FIG. 9 is a flowchart showing detailed contents of S403 (specimen information analysis processing).

FIG. 9 is a flowchart showing detailed contents of S403 (specimen information analysis processing). In the following description, an operation subject of each step is the corresponding processing unit, but since each processing unit is implemented by a program stored in the memory 107 or the storage device 108, the controller (processor) 106 which is an execution subject of the program may be interpreted as the operation subject of each step.

In the specimen information analysis processing according to the present embodiment, by the detection target region extraction unit 303 and the analysis unit 304, the detection target region 117 is extracted based on the developed view generated by the developed view synthesis unit 302, and the state of the detection target is determined and the solution volume is measured based on the color of the extracted region and the size of the region.

(FIG. 9: Step S901: Label Region Specification and Removal)

The detection target region extraction unit 303 performs processing for specifying a label region unnecessary for the specimen information analysis from the developed view output in S402. Specific processing of this step will be described later.

(FIG. 9: Step S902: Horizontal Position Specification)

The detection target region extraction unit 303 removes the label region specified in S901 from the developed view output in the developed view synthesis processing in S402 as an unnecessary region for the specimen information analysis. The detection target region extraction unit 303 further generates a mask for specifying a horizontal region to be analyzed in the processing of S903 and subsequent steps. Alternatively, the detection target region extraction unit 303 performs the processing for generating an image in which only the horizontal region necessary for analysis is cut out from the developed view. The horizontal region is set, for example, based on the coordinates of both ends of the label region specified in S901.

(FIG. 9: Step S903: Vertical Position Specification)

The detection target region extraction unit 303 performs edge detection processing and the like on the mask for specifying the horizontal region output in S902 or the image obtained by cutting out only the horizontal region. For example, by identifying an edge of each region of the specimen, the detection target region 117 is separated from a region of a separating agent or the like, and the detection target region 117 is extracted.

(FIG. 9: Step S904: Specimen Information Analysis Processing)

The analysis unit 304 determines the specimen state and calculates the solution volume based on the color information and the region (coordinates and the number of pixels) information of the detection target region 117 specified in the processing of S903. For example, when the detection target is serum, since the serum color varies depending on the serum state (normal, hemolysis, icterus, and chyle), the serum state of the specimen can be determined by storing the color feature value, the range of the color space used for classification, and the threshold in the memory 107 and collating the color information acquired in the detection target region 117. The solution volume of the detection target is calculated based on the information of the region (coordinates and the number of pixels) of the detection target region 117 and diameter information of the biological sample tube 116 acquired by the biological sample tube information acquisition unit 203.

(FIG. 9: Step S904: Specimen Information Analysis Processing: Supplement)

In the specimen information analysis processing of S904, advantages of extracting the detection target region 117 from the developed view rather than one captured image of the biological sample tube 116 include: (a) by the method of setting a predetermined region in S402, variation in the color of the detection target region 117 can be reduced and the determination accuracy of the state can be improved. (b) in the biological sample tube 116 to which the colored label 118 is attached, the removal accuracy of the colored label 118 can be improved, and erroneous extraction of the detection target region 117 by the colored label 118 can be avoided. According to the method of setting a predetermined region, the extracting processing of the detection target region 117 can be performed after removing an unnecessary region such as the reflected component in the captured image of the biological sample tube 116 from the developed view, so that the erroneous extraction of the detection target region 117 due to noise and erroneous analysis and erroneous determination of the color of the detection target can be avoided.

In S901, an example of a method of specifying a label region having no colored portion (for example, a white label, a barcode, and a label with only black printed) will be described. The label region having no colored portion is specified by image processing such as barcode region detection and/or white detection processing. Detection of the barcode region includes, for example, an extraction method using a color threshold of black color and an extraction method using image processing such as edge extraction. In the case of detection by the edge extraction, even thin lines of barcodes can be detected by combining morphological processing. In the detection of the white region, the color threshold (for example, hue, saturation, or brightness) is set, and a region corresponding to the range of the threshold is extracted as a label region. First, the barcode region may be specified, the detected barcode region may be used as the reference coordinates, and the range of the label may be specified and removed based on information such as a size of the label acquired by the biological sample tube information acquisition unit 203.

In S901, an example of a method of specifying the region of the colored label 118 having a color similar to the color of the detection target will be described. Suitable combinations of the detection target and the colored label 118 include, for example, a yellow serum and a yellow-colored label 118 and a red serum and a red-colored label 118. When the color of the detection target is different for each measurement (specimen) such as red or yellow, a combination of the yellow serum and the red-colored label 118 or the red serum and the yellow-colored label 118 is also applicable.

As shown in the developed view of FIG. 6, the colored label 118 includes a colored portion in a part of the end of the white label or a colored portion in a vertical position of the barcode region. When a colored portion having a color is similar to the color of the detection target region 117, the colored portion may be erroneously extracted as the detection target region 117 and the analysis accuracy of the specimen information may be reduced. By specifying and removing the region of the colored label 118 from the developed view before extracting the detection target region 117, erroneous extraction of the colored portion as the detection target is avoided and the analysis accuracy is improved.

In the label calibration to be described later, a method of specifying the region of the colored label 118 having a color similar to the color of the detection target region includes: (method 1) a method of specifying a colored portion based on color information of the colored label 118 acquired by the biological sample tube information acquisition unit 203: and (method 2) a method of specifying a colored portion based on information on a size of the colored portion and/or a position of the colored portion in the label (right end, left end, top and bottom positions in the label, etc.) acquired by the biological sample tube information acquisition unit 203.

(Method 1) The method of specifying a colored portion based on color information will be described. The biological sample tube information acquisition unit 203 acquires in advance color information (hue, saturation, brightness value distribution and/or threshold) of a label to be used by performing the label calibration processing (to be described later), and stores the color information of the label to be used in the memory 107 or the storage device 108. In S901, the color information of the colored label 118 stored in the memory 107 or the storage device 108 is acquired, a color threshold (hue, saturation, brightness, and the like) of the colored label 118 is set, a mask for extracting only a colored portion of the colored label 118 is created from the developed view, and a region of the colored portion is specified.

(Method 1: Supplement) The color information of the colored label 118 to be used may be input by the user using, for example, a touch panel which is the input and output interface 109, and may be stored in the memory 107 or the storage device 108. The biological sample tube information acquisition unit 203 specifies the region of the colored label 118 by searching within the color space based on a color designated by the user. Accordingly, a color that matches the colored label 118 can be quickly found.

(Method 2) The method of specifying a colored portion based on information on a size of the colored portion and/or a position of the colored portion in the label (right end, left end, top and bottom positions in the label, etc.) acquired by the biological sample tube information acquisition unit 203 will be described. The biological sample tube information acquisition unit 203 acquires a size of the colored label 118 and/or the position of the colored portion in the label, for example, by performing the label calibration processing to be described later, and stores the acquired size and/or position in the memory 107 or the storage device 108. Alternatively, the information may be input by the user using, for example, a touch panel which is the input and output interface 109, and may be stored in the memory 107 or the like.

(Method 2: Specific Procedure) The biological sample tube information acquisition unit 203 specifies the barcode region and the white label region by the above-described example of the method of specifying a label region having no colored portion. The region of the colored portion is specified based on the size of the colored label 118 and/or arrangement information of the colored portion in the label with reference to coordinates of the specified barcode region or the w % bite region. For example, in a label having a colored portion at an end thereof as in the developed view of FIG. 6, after edge coordinates of the white label region or the barcode region are detected, a region (left side of the barcode region in FIG. 6) of the colored label 118 on an outer side by the size of the colored portion is specified based on the edge coordinates.

<Detailed Contents of Label Calibration Processing>

Figure 10:
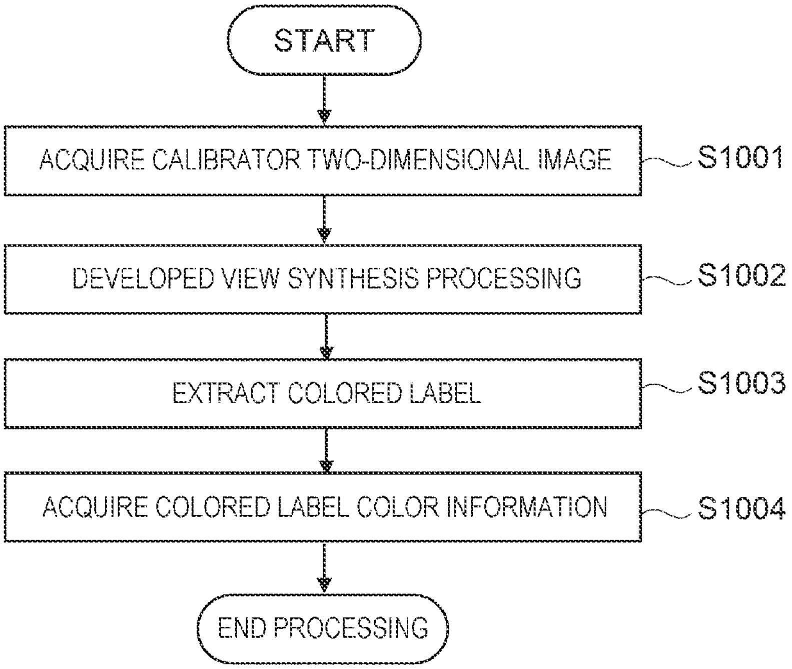
FIG. 10 is a flowchart showing detailed contents of label calibration.

FIG. 10 is a flowchart showing detailed contents of label calibration. In the following description, an operation subject of each step is the corresponding processing unit, but since each processing unit is implemented by a program stored in the memory 107 or the storage device 108, the controller (processor) 106 which is an execution subject of the program may be interpreted as the operation subject of each step.

The label calibration processing performed by the biological sample tube information acquisition unit 203 is for acquiring information such as the color information and the size of the colored label 118 from a captured image of an empty biological sample tube 116 (hereinafter, referred to as a calibrator) to which the colored label 118 to be used is attached, before the specimen analysis processing. This flowchart can be implemented as a part of S901.

As a method of separating the color of the colored label 118, a method of acquiring the color distribution such as hue, saturation, and brightness from the captured image or the developed view of the biological sample tube 116 and setting a threshold capable of separating the both is considered, but even when the color of the detection target region 117 is uniform, a color difference may occur due to the presence or absence of a label on the back surface or a reflected component on the surface of the biological sample tube 116, and erroneous detection of detecting a color difference of the detection target region 117 as the color difference by the colored label 118 occurs. Therefore, by inputting in advance the information of the label to be used by the label calibration processing of this flowchart or the user input, erroneous extraction of the color difference of the detection target region 117 as the colored label 118 is avoided, and the removal accuracy of the colored label 118 is improved.

(FIG. 10: Step S1001: Calibrator Two-dimensional Image Acquisition)

The biological sample tube information acquisition unit 203 acquires a plurality of two-dimensional color images of the calibrator captured by the fixed camera 101. An image acquisition method is the same as that in S401.

(FIG. 10: Step S1002: Developed View Synthesis Processing)

The biological sample tube information acquisition unit 203 performs the same processing as the developed view synthesis processing in FIG. 4, and creates one developed view based on the two-dimensional color images of the calibrator acquired in S1001.

(FIG. 10: Step S1003: Colored Label Extraction)

The biological sample tube information acquisition unit 203 specifies the region of the colored label 118 based on color distribution of the developed view output in S1002.

(FIG. 10: Step S1003: Extraction of Colored Label: Specific Example 1)

A method of specifying the region of the colored label 118 includes a method in which color distribution of the developed view (reference image) created based on the captured images of the empty biological sample tube 116 to which the colored label 118 is not attached is compared with the color distribution of the developed view of the calibrator, a color difference therebetween is extracted as the color of the colored label 118, and a region of the corresponding color is specified as a region of the colored label from the developed view.

(FIG. 10: Step S1003: Colored Label Extraction: Specific Example 2)

There is also a method in which the user inputs the color information of the colored label 118 using a touch panel or the like through the input and output interface 109 or the like, and the corresponding color is extracted from the developed view of the calibrator. For example, a color palette of a plurality of colors is displayed on a screen such as a touch panel, and the user selects the color of the colored label 118. The biological sample tube information acquisition unit 203 acquires information on a color threshold corresponding to the color palette stored in the memory 107, the storage device 108, or the like in advance, and sets the color threshold of the colored label 118 based on the color palette selected by the user. A color corresponding to the acquired color threshold is extracted from the developed view and specified as the region of the colored label. Alternatively, the developed view of the calibrator may be displayed on a screen such as a touch panel, and the user may select and specify the region of the colored label 118 directly or using a cursor or the like on the screen.

(FIG. 10: Step S1004: Acquisition of Colored Label Color Information)

The biological sample tube information acquisition unit 203 acquires the color distribution of the region of the colored label 118 specified in step 902, sets a color threshold that defines a label color of the colored label 118 based on the acquired color information, and stores the color threshold in the memory 107, the storage device 108, or the like.

(FIG. 10: Step S1004: Colored Label Color Information Acquisition: Specific Example)

A method of setting a threshold in this step includes the following procedure. For example, the biological sample tube information acquisition unit 203 can acquire a histogram of hue, saturation, brightness, or the like in the color distribution of the region of the colored label 118 specified in step 902, and can set, for example, a range of ±5% around a mode value, an average value, or the like as the threshold.

First Embodiment: Summary

The biological specimen analysis device 100 according to the first embodiment acquires a two-dimensional color image of the biological sample tube while rotating the biological sample tube by the biological sample tube rotation mechanism, and performs the processing of synthesizing one developed view from the plurality of two-dimensional color images and the specimen information analysis processing. In the processing for synthesizing the developed view, the predetermined region setting processing, the two-dimensional color image cut-out processing, the two-dimensional color image cut-out processing, and the cut-out images connection processing are performed. In the specimen information analysis processing, the label region specifying processing, the horizontal direction detecting position specifying processing, and the vertical direction detecting position specifying processing are performed. As described above, by removing the label region and extracting the detection target region (for example, the serum region) based on the developed view synthesized from the plurality of two-dimensional color images, it is possible to separate the colored label and the detection target region with high accuracy and analyze a liquid contained in the detection target region.

The biological specimen analysis device 100 according to the first embodiment cuts out and synthesizes the predetermined region so as to remove noise such as the reflected component appearing in the captured image (see FIG. 8). Further, a portion where the variation in the brightness value along the circumferential direction of the biological sample tube 116 is within the allowable range is cut out, and the cut-out image is connected to create the developed view (see FIG. 7). Accordingly, improvement in the analysis accuracy of the specimen information can be expected.

The biological specimen analysis device 100 according to the first embodiment performs label calibration by comparing a biological sample tube to which no label is attached with a biological sample tube to which a label is attached. Label information is acquired in advance by the label calibration, and the region of the colored label is specified and removed from the acquired information. Since the label calibration is performed in advance, the colored label and the detection target region are not confused with each other, erroneous analysis in which the color of the colored label is erroneously extracted as the color of the detection target can be avoided, and a more accurate analysis result can be expected.

Second Embodiment

Figure 11:
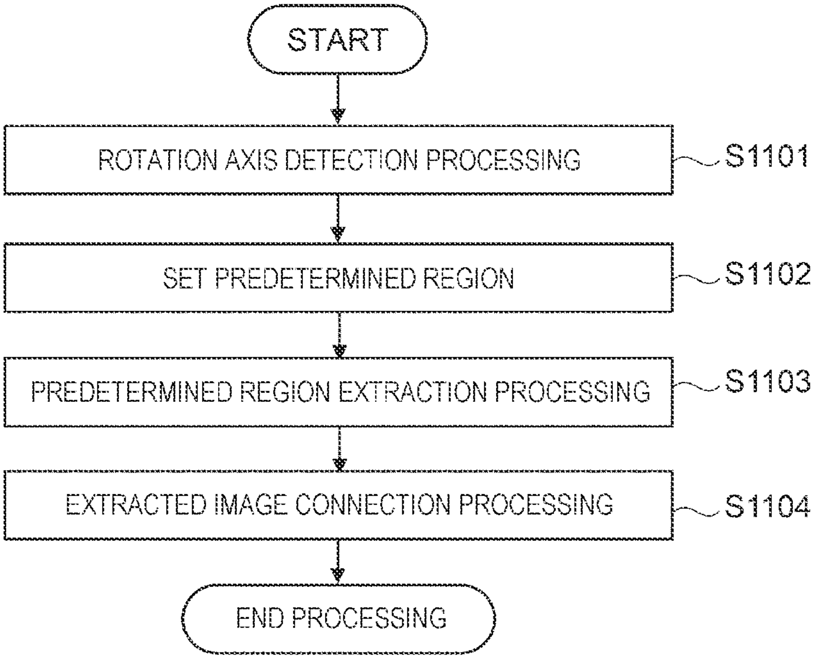
FIG. 11 is a flowchart showing developed view synthesis processing according to a second embodiment.

FIG. 11 is a flowchart showing developed view synthesis processing according to a second embodiment of the present disclosure. In the second embodiment, instead of cutting out a captured image based on a predetermined region set in advance, an inclination of the biological sample tube 116 in the captured image and the deviation from an image center are detected for each captured image, and the detected deviation is set as a rotation axis of the biological sample tube 116 (S1101). The predetermined region is set for each image based on the detected rotation axis (S1102 to S1104). Configurations other than the developed view synthesis processing are the same as those in the first embodiment.

Figure 12:
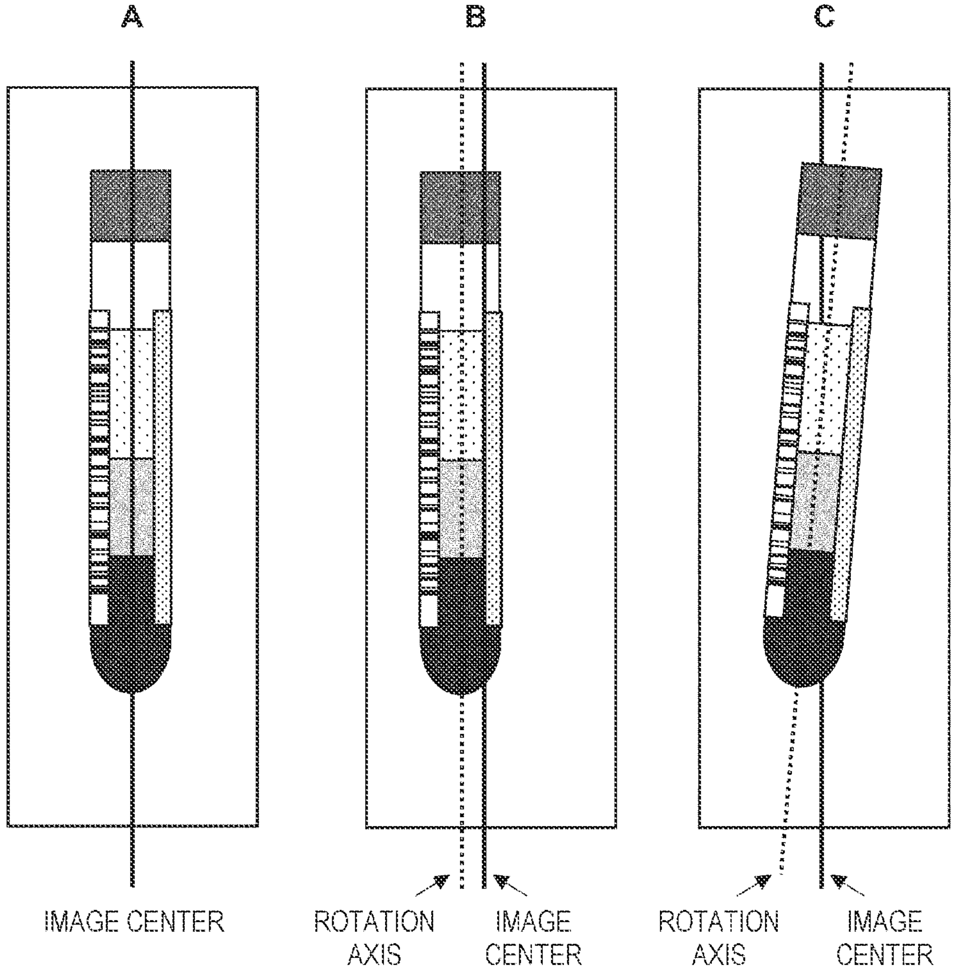
FIG. 12 is a diagram showing examples of a rotation axis of the biological sample tube 116.

FIG. 12 is a diagram showing examples of a rotation axis of the biological sample tube 116. Images of the biological sample tube 116 gripped by the gripping mechanism 111 and rotated by the biological sample tube rotation mechanism 114 may be captured with the image center and the rotation axis aligned as shown in a left side of FIG. 12, and may be captured with the rotation axis laterally shifted as shown in the center of FIG. 12 or with the rotation axis inclined as shown in a right side of FIG. 12. When characteristics of the rotation axis are not constant between measurements or between devices, the predetermined region is not set in advance by a fixed value, and by dynamically setting the predetermined region based on the rotation axis of the biological sample tube 116, the synthesis accuracy of the developed view is improved.

Figure 13:
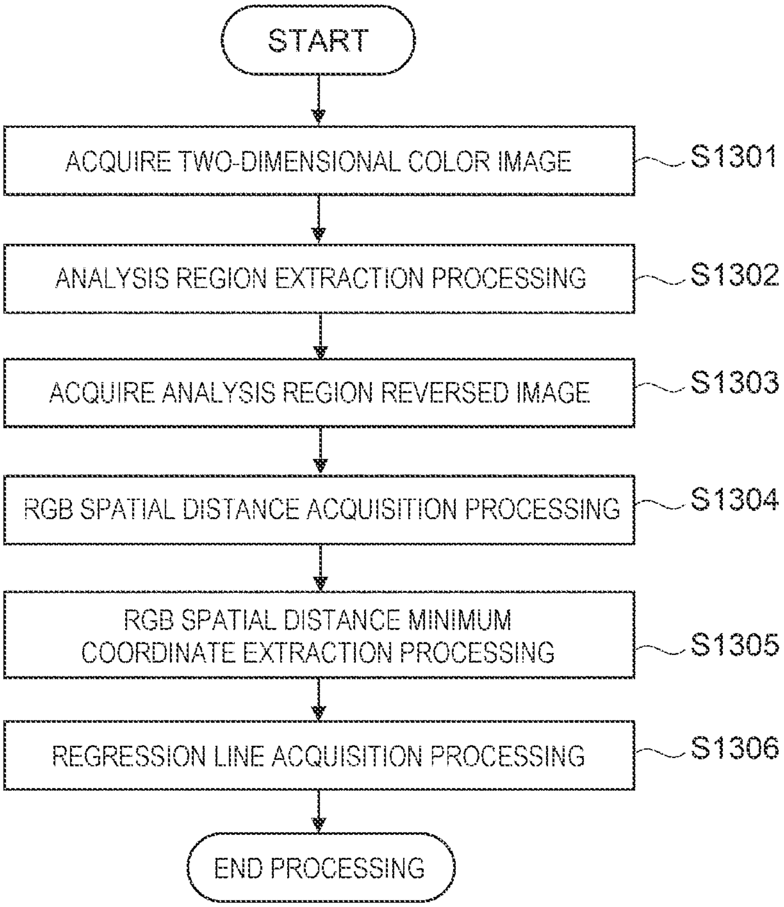
FIG. 13 is a flowchart showing an example of rotation axis detection processing (S1101) of the biological sample tube 116.

FIG. 13 is a flowchart showing an example of rotation axis detection processing (S1101) of the biological sample tube 116. The region setting unit 202 performs the rotation axis (regression line) detection processing of the biological sample tube 116 according to this flowchart. This flowchart uses a left-right symmetry of the biological sample tube 116 to detect the inclination of the biological sample tube 116 and the positional deviation of a central axis from a distance in an RGB space between the captured image and a reversed image of the captured image.

(FIG. 13: Step S1301: Two-dimensional Color Image Acquisition)

The region setting unit 202 acquires a two-dimensional color image of the biological sample tube 116 captured by the fixed camera 101. An image acquisition method is the same as that in S401.

(FIG. 13: Steps S1302: Analysis Region Extraction Processing)

The region setting unit 202 extracts an analysis region from the two-dimensional color image acquired in step 1301. Since the analysis is performed on the premise of the left-right symmetry of the biological sample tube 116, a region to which no label is attached is extracted as the analysis region from the captured image of the biological sample tube 116. For example, in the case of a blood specimen after centrifugation, a region in which an image of a blood clot is captured in the vicinity of the bottom of the biological sample tube 116 is selected. A size of the analysis region is set, for example, such that a width thereof in the horizontal direction is about the diameter of the biological sample tube 116, and a width thereof in the vertical direction is 50 pixels. A setting value of the analysis region does not need to be changed for each captured image as long as an image of the same specimen is captured, and may be a fixed value. When biological sample tubes 116 having different lengths are measured, it is necessary to set the analysis region according to the length of the biological sample tube 116. In this case, a plurality of setting values are stored in the memory 107, the storage device 108, or the like so that the setting values can be changed based on length information of the biological sample tube 116 acquired by the biological sample tube information acquisition unit 203.

(FIG. 13: Steps S1303: Analysis Region Reversed Image Acquisition)

The region setting unit 202 acquires or generates a horizontally reversed image of the analysis region to be set in the two-dimensional color image.

(FIG. 13: Steps S1304: RGB Spatial Distance Acquisition)

The region setting unit 202 acquires a distance in an RGB color space between the image of the analysis region and the reversed image for each pixel of the analysis region.

(FIG. 13: Steps S1305: RGB Color Space Distance Minimum Coordinate Extraction Processing)

The region setting unit 202 compares distances in the RGB color space acquired in S1304 for each vertical coordinate of the analysis region, and acquires a minimum value for each vertical coordinate and coordinates at which the minimum value is obtained.

(FIG. 13: Steps S1306: Regression Line Acquisition Processing)

The region setting unit 202 connects the coordinates of the minimum value detected in S1305 in the vertical direction to extract center coordinates of the analysis region, and sets a linear regression line based on the extracted coordinates.

The region setting unit 202 sets the predetermined region based on the rotation axis detected by this flowchart, so that the desired region can be set as the predetermined region even when the rotation axis of the biological sample tube 116 is inclined or laterally shifted at the time of measurement, and thus the synthesis accuracy of the developed view is improved.

Second Embodiment: Summary

The biological specimen analysis device 100 according to the second embodiment cuts out and synthesizes a predetermined region set based on rotation speed information of a biological sample tube rotation mechanism and information on an inclination and a lateral shaft of a biological sample tube in the developed view synthesis processing. Accordingly, improvement in the synthesis accuracy of the developed view used for the specimen information analysis can be expected.

Third Embodiment

Figure 14:
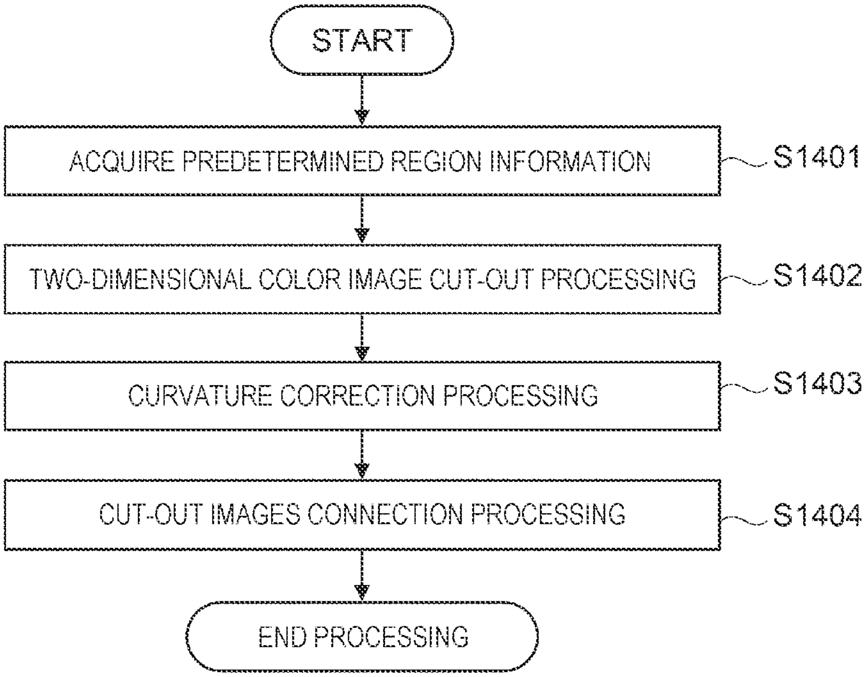
FIG. 14 is a flowchart showing developed view synthesis processing according to a third embodiment.

FIG. 14 is a flowchart showing developed view synthesis processing according to a third embodiment of the present disclosure. In the third embodiment, in the developed view synthesis processing, cut-out two-dimensional color images are subjected to the curvature correction processing, and then the images are connected to output a developed view. By performing the curvature correction processing, for example, when the reference coordinates of the predetermined region are shifted from the center of the biological sample tube 116 as shown in FIG. 8, the distortion of the developed view after the synthesis is reduced. When noise such as a reflection region exists in the central region of the biological sample tube 116 as in the example of FIG. 8, since it is possible to acquire a developed view without distortion by shifting the predetermined region, the analysis accuracy of the detection target region 117 is improved. Configurations other than the developed view synthesis processing are the same as those in the first embodiment.

S1401 corresponds to S501, S1402 corresponds to S502, and S1404 corresponds to S504. In S1403, the region setting unit 202 calculates a correction coefficient in consideration of the curvature of the biological sample tube 116 based on information on the diameter of the biological sample tube 116 acquired by the biological sample tube information acquisition unit 203 and information of the predetermined region set in S1401, and corrects the cut-out image by, for example, an affine transformation.

Figure 15:
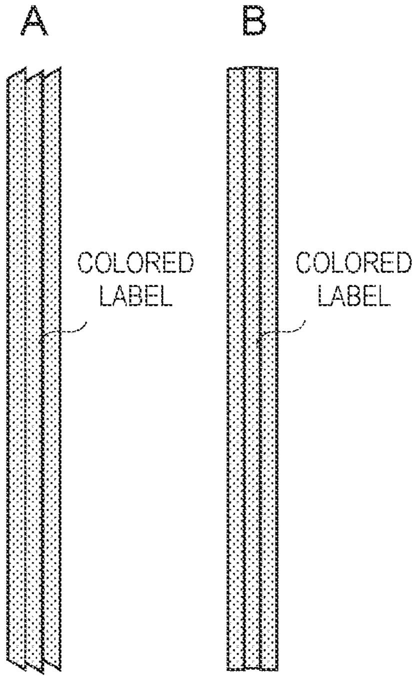
FIG. 15 is an example in which a cut-out image is distorted due to curvature of the biological sample tube 116.

FIG. 15 is an example in which a cut-out image is distorted due to the curvature of the biological sample tube 116. For example, when the predetermined region is set in a region shifted from the center of the biological sample tube 116 in FIG. 8 and the developed view is synthesized, the colored label 118 may be distorted as shown in a left side of FIG. 15. Specifically, when a rectangular (strip-like) region is cut out as the predetermined region without considering the curvature of the biological sample tube 116, distortion occurs in the synthesized image as shown in the left side of FIG. 15. A right side of FIG. 15 shows the colored label 118 in the case where an image of the cut-out predetermined region is subjected to the distortion correction and then the synthesis processing according to the flowchart of FIG. 14. By correcting the distortion for each cut-out image in consideration of the size and a shape (curvature) of the biological sample tube 116, the distortion of the developed view after the synthesis is reduced.

Fourth Embodiment

Figure 16:
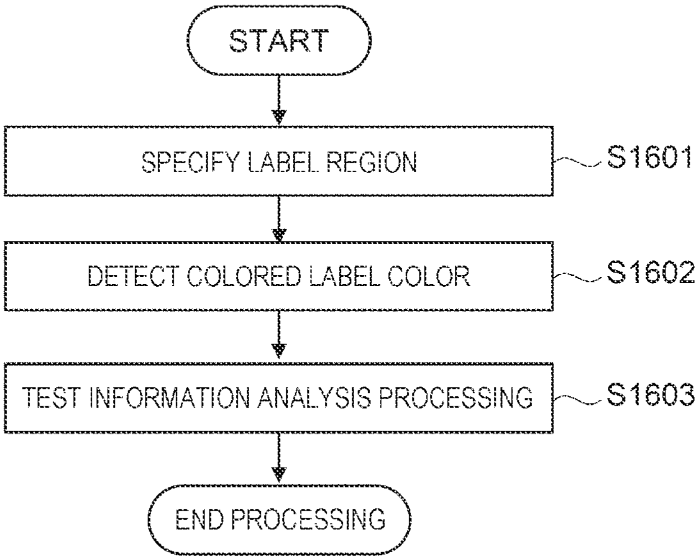
FIG. 16 is a flowchart showing detailed processing of S403 in a fourth embodiment.

FIG. 16 is a flowchart showing the detailed processing of S403 in a fourth embodiment of the present disclosure. In S403 according to the first embodiment, it has been described that the state of the detection target is determined and the solution volume is measured based on the information on the color and size of the detection target region 117. In the fourth embodiment, test information such as a subject and a specimen is acquired based on information of the detected label or colored label 118. Other configurations are the same as those in the first embodiment.

The information acquired from the label or the colored label 118 includes color information of the barcode and the colored portion. By accessing a database in which barcode information is associated with a read content (for example, an ID number or the like) and information of a subject stored in an external host server or the like, it is possible to acquire the information of the subject by the biological specimen analysis device according to the present embodiment.

For example, by storing, in an external server, the memory 107, or the storage device 108, a database in which information such as a type of biochemical analysis or a type of a specimen (serum, whole blood, urine, or the like) is associated with the color of the colored label 118, it is possible to acquire the analysis content or the type of the specimen based on the acquired color information of the colored label 118.

The biological specimen analysis device 100 according to the present embodiment stores the color information corresponding to the type of the biological sample in the memory 107 or the storage device 108 in advance, and determines the type of the biological sample by collating the acquired color information of the detection target region 117 with the color information stored in the memory 705 or the like in advance by the analysis unit 304. At this time, it is possible to analyze a plurality of types of biological samples by storing data to be collated for each specimen type and selecting the data to be collated from the acquired specimen type based on the color information of the colored label 118.

Modification of Present Disclosure

The present disclosure is not limited to the embodiments described above, and has various modifications. For example, the embodiments described above have been described in detail for easily understanding the invention, and the invention is not necessarily limited to those including all the configurations described above. Further, a part of the configuration of one embodiment can be replaced with the configuration of another embodiment, and the configuration of another embodiment can be added to the configuration of one embodiment. It is possible to add, delete, and replace other configurations for a part of the configurations of each embodiment.

In the above embodiments, after the cut-out region is determined in S501, the coordinates and size of the cut-out region may be changed by user designation. Specifically, the user designates the coordinates and the size of the cut-out region via a user interface, and the controller 106 sets the cut-out region according to the designation.

Functions according to the embodiments of the present disclosure can also be implemented by a program code of software. In this case, a storage medium in which the program code is recorded is provided to a system or a device, and a computer (or a CPU or an MPU) of the system or the device reads the program code stored in the storage medium. In this case, the program code itself read from the storage medium implements the functions according to the above-described embodiments, and the program code itself and the storage medium storing the program code constitute the present disclosure. Examples of the storage medium for supplying such a program code include a flexible disk, a CD-ROM, a DVD-ROM, a hard disk, an optical disk, a magneto-optical disk, a CD-R, a magnetic tape, a nonvolatile memory card, and a ROM.

An operating system (OS) or the like running on the computer may perform a part or all of the actual processing based on an instruction of the program code, and the function of the above-described embodiments may be implemented by the processing. After the program code read from the storage medium is written in a memory of the computer, the CPU or the like of the computer may perform a part or all of the actual processing based on the instruction of the program code, and the functions of the above embodiments may be implemented by the processing.

Further, by distributing the program code of software for implementing the functions of the embodiments via a network, the program code may be stored in a storage unit such as a hard disk or a memory of the system or the device, or in the storage medium such as a CD-RW or a CD-R, and the computer (or a CPU or an MPU) of the system or the device may read out and execute the program code stored in the storage unit or the storage medium at the time of use.

In the embodiments described above, a control line and an information line are considered to be necessary for description, and all control lines and all information lines are not necessarily shown in a product. All configurations may be connected.

REFERENCE SIGNS LIST

100 biological specimen analysis device
101 fixed camera
102 background plate
103*a* and 103*b* light source
104*a* and 104*b* light source driver
105 biological sample tube holder
106 controller
107 memory
108 storage device
109 input and output interface
110 databus
111 gripping mechanism
112 movement mechanism
113 vertical control driver
114 biological sample tube rotation mechanism
115 rotation control driver
116 biological sample tube
117 detection target region
118 colored label
201 image processing unit
202 region setting unit
203 biological sample tube information acquisition unit
301 region cut-out unit
302 developed view synthesis unit
303 detection target region extraction unit
304 analysis unit

The invention claimed is:

1. A biological specimen analysis device for analyzing a biological specimen contained in a biological sample tube to which a label is attached, the biological specimen analysis device comprising:

a rotation mechanism configured to grip and rotate the biological sample tube;

a camera configured to acquire a two-dimensional color image by capturing an image of the biological sample tube; and a processor configured to process the two-dimensional color image, wherein the processor cuts out a partial region in the two-dimensional color image, the processor synthesizes a developed view of the biological sample tube by connecting an image of the cut-out partial region along a circumferential direction of the biological sample tube, and the processor extracts a detection target region as a detection target in the two-dimensional color image from the developed view, and the processor cuts out, as the partial region, a portion of the two-dimensional color image in which variation in a brightness value along the circumferential direction of the biological sample tube is within a predetermined range to keep the variance of the brightness value in the developed view within an allowable range.

2. The biological specimen analysis device according to claim 1, wherein the processor identifies an image of the label included in the two-dimensional color image based on information indicating a feature of the image of the label, and the processor extracts the detection target region from a portion of the two-dimensional color image excluding the identified image of the label.

3. The biological specimen analysis device according to claim 2, wherein the processor uses, as the information indicating the feature of the image of the label, information obtained by comparing the two-dimensional color image of the biological sample tube to which the label is attached with the two-dimensional color image of the biological sample tube to which no label is not attached.

4. The biological specimen analysis device according to claim 2, further comprising:

an interface configured to receive an instruction input specifying at least one of a color of the label, a position of the label, a shape of the label, and a size of the label, wherein the processor determines the information indicating the feature of the image of the label according to the instruction input received by the interface.

5. The biological specimen analysis device according to claim 2, further comprising:

a storage device configured to store data describing at least one of a color of the label, a position of the label, a shape of the label, and a size of the label, wherein the processor uses information described in the data stored in the storage device as the information indicating the feature of the image of the label.

6. The biological specimen analysis device according to claim 1, further comprising:

a light source configured to irradiate the biological sample tube with light, wherein the processor cuts out, as the partial region, a portion in which the amount of reflected light noise generated by reflecting the light emitted by the light source on a surface of the biological sample tube is equal to or less than an allowable threshold.

7. The biological specimen analysis device according to claim 1, wherein the processor controls a rotation speed of the rotation mechanism, an image-capturing timing of the two-dimensional color image, and the number of captured two-dimensional color images.

8. The biological specimen analysis device according to claim 1, wherein the processor acquires a color of the detection target region from the developed view, and the processor specifies a type of the biological specimen included in the detection target region by comparing the acquired color of the detection target region with data describing a color of the biological specimen, and outputs the specified type.

9. The biological specimen analysis device according to claim 1, wherein the processor calculates the amount of the biological specimen included in the detection target region using information describing coordinates of the detection target region, the number of pixels of the detection target region, and a size of the biological sample tube.

10. The biological specimen analysis device according to claim 1, wherein the processor corrects distortion of the two-dimensional color image using curvature of the biological sample tube, and the processor synthesizes the developed view using the two-dimensional color image in which the distortion is corrected.

11. The biological specimen analysis device according to claim 1, further comprising:

an interface configured to receive an instruction input specifying a position and a size of the partial region, wherein the processor determines the position and the size of the partial region according to the instruction input received by the interface.

12. The biological specimen analysis device according to claim 1, wherein the processor identifies an image of the label included in the two-dimensional color image, and the processor specifies an attribute of the biological specimen by extracting information describing the attribute of the biological specimen from the identified image of the label, and analyzes the biological specimen according to the specified attribute.

13. A biological specimen analysis device for analyzing a biological specimen contained in a biological sample tube to which a label is attached, the biological specimen analysis device comprising:

a rotation mechanism configured to grip and rotate the biological sample tube;

a camera configured to acquire a two-dimensional color image by capturing an image of the biological sample tube; and a processor configured to process the two-dimensional color image, wherein the processor cuts out a partial region in the two-dimensional color image, the processor synthesizes a developed view of the biological sample tube by connecting an image of the cut-out partial region along a circumferential direction of the biological sample tube, the processor extracts a detection target region as a detection target in the two-dimensional color image from the developed view, the processor detects, in the two-dimensional color image, a position of a rotation axis when the rotation mechanism rotates the biological sample tube, and the processor specifies a cut-out region as the partial region by using a direction orthogonal to the detected rotation axis as the circumferential direction of the biological sample tube.

14. The biological specimen analysis device according to claim 13, wherein the processor generates a reversed image obtained by reversing the two-dimensional color image horizontally, the processor calculates a distance in a color space between the two-dimensional color image and the reversed image, and the processor specifies the rotation axis by connecting coordinates having a minimum distance along a vertical direction.

* * * * *